US012151360B2

(12) United States Patent
(10) Patent No.: US 12,151,360 B2
(45) Date of Patent: Nov. 26, 2024

Pollard, Jr. et al.

(54) SWING ARM SYSTEM AND METHOD

(71) Applicant: DISH Wireless L.L.C., Englewood, CO (US)

(72) Inventors: Jimmy A. Pollard, Jr., Englewood, CO (US); John Leonard Pye, Englewood, CO (US)

(73) Assignee: DISH Wireless L.L.C., Englewood, CO (US)

( * ) Notice: Subject to any disclaimer, the term of this patent is extended or adjusted under 35 U.S.C. 154(b) by 230 days.

(21) Appl. No.: 17/944,967

(22) Filed: Sep. 14, 2022

(65) Prior Publication Data

US 2024/0083015 A1 Mar. 14, 2024

(51) Int. Cl.
*B25H 5/00* (2006.01)
*A47C 9/06* (2006.01)

(52) U.S. Cl.
CPC *B25H 5/00* (2013.01); *A47C 9/06* (2013.01)

(58) Field of Classification Search
CPC .................................. A47C 9/06; B25H 5/00
USPC .......................... 297/344.21; 248/282.1, 415
See application file for complete search history.

(56) References Cited

U.S. PATENT DOCUMENTS 435,307 A * 8/1890 Hill .......................... A47C 9/06 248/240.2
3,186,761 A * 6/1965 Propst .................... A47C 9/022 297/344.1
4,620,686 A * 11/1986 Conant .................. F16M 13/02 297/344.14
5,465,437 A * 11/1995 Herman ................. A47K 3/282 4/604
5,509,680 A * 4/1996 Scharf .................. A61G 5/1054 248/282.1
5,556,164 A * 9/1996 Cindea ................... A47C 9/022 297/344.22

* cited by examiner

*Primary Examiner* — Milton Nelson, Jr.
(74) *Attorney, Agent, or Firm* — Seed IP Law Group LLP

(57) ABSTRACT

A system for providing operator support over a pallet is disclosed. The system includes: an upright support brace, a first pivot member, a rotatable support bracket, a second pivot member, a rotatable arm, a seat support member, and a seat. The upright support brace is connected to one or more primary bearing hubs. The first pivot member is rotatably connected to the upright support brace by the one or more bearing hubs. The rotatable support bracket is connected to first pivot member at a first end and is connected to one or more secondary bearing hubs at a second end. The second pivot member is rotatably connected to the rotatable support bracket by the one or more secondary bearing hubs. The rotatable arm is connected to the second pivot member. The seat support member is operatively connected with the rotatable arm. The seat is operatively connected to the seat support member.

18 Claims, 4 Drawing Sheets

SWING ARM SYSTEM AND METHOD

BACKGROUND

Large amounts of products and systems are loaded and shipped on pallets through shipped containers and warehouses. Often, workers will have to perform assembly or other operations on the products or systems on the pallets. This frequently requires the workers to be positioned in difficult or awkward postures to accomplish these tasks. Having these workers positioned in difficult or awkward postures for extended periods of time can lead to accidents and injuries.

BRIEF SUMMARY

The present disclosure relates generally to a swing arm system and method, and more particularly, but not exclusively, to a swing arm system and method for providing assistance to pallet workers. There is a continuing need for system and method that provide support to workers that have to perform assembly or other operations on the products or systems on the pallets. Such system and method can help prevent accidents and injuries, which should always be a goal in manufacturing, shipping, and warehousing environments.

The present disclosure is directed towards a swing arm system for providing operator support over a pallet. In at least one implementation, the swing arm system includes: a ground-engaging support platform, a main vertical support brace, a vertical long pivot shaft, a rotatable rectangular support bracket, a holder, a vertical short pivot shaft, a swing arm, a seat support shaft, and a seat. The main vertical support brace is connected to the ground-engaging support platform. The main vertical support brace includes a top bearing hub and a bottom bearing hub. The vertical long pivot shaft is rotatably connected to the main vertical support brace by the top bearing hub and a bottom bearing hub. The rotatable rectangular support bracket includes a top brace, a bottom brace, and a front vertical brace that connects the top brace and bottom brace. The top brace is connected to the vertical long pivot shaft near the top bearing hub and the bottom brace is connected to the vertical long pivot shaft near the bottom bearing hub. The front vertical brace includes an upper bearing hub and a lower bearing hub. The holder is mounted to the bottom brace of the rotatable rectangular support bracket. Additionally, the holder is an operative associated with a ground-engaging member. The vertical short pivot shaft is rotatably connected to the front vertical brace by the upper bearing hub and a lower bearing hub. The swing arm is connected to the vertical short pivot shaft. Additionally, the swing arm includes a seat support collar. The seat support shaft is mounted on the seat support collar. The seat is operatively connected to the seat support shaft.

In some embodiments of the swing arm system, one or more angled platform engaging supports secure the main vertical support brace to the ground-engaging support platform. In another aspect of some embodiments, the ground-engaging support platform includes fastener holes for removable securement to a ground. In still another aspect of some embodiments, the ground-engaging member is a wheel, and wherein the holder mounted to the bottom brace is a wheel holder. In yet another aspect of some embodiments, the swing arm includes a brace support on its upper surface. In a further aspect of some embodiments, the seat support shaft is adjustable to raise and lower the seat. In an additional aspect of some embodiments, the seat is rotatably connected to the seat support shaft.

In one or more other embodiments, a system for providing operator support over a pallet is disclosed. Some embodiments of such systems include: an upright support brace, a first pivot member, a rotatable support bracket, a second pivot member, a rotatable arm, a seat support member, and a seat. The upright support brace is connected to one or more primary bearing hubs. The first pivot member is rotatably connected to the upright support brace by the one or more bearing hubs. The rotatable support bracket is connected to first pivot member at a first end and is connected to one or more secondary bearing hubs at a second end. The second pivot member is rotatably connected to the rotatable support bracket by the one or more secondary bearing hubs. The rotatable arm is connected to the second pivot member. The seat support member is operatively connected with the rotatable arm. The seat is operatively connected to the seat support member.

In some embodiments of the swing arm system, the system further includes a ground-engaging support platform. In another aspect of some embodiments, one or more angled platform engaging supports secure the main vertical support brace to the ground-engaging support platform. In still another aspect of some embodiments, the ground-engaging support platform includes fastener holes for removable securement to the ground. In yet another aspect, some embodiments further include a holder mounted to the rotatable support bracket, the holder operative associated with a ground-engaging member. In a further aspect of some embodiments, the ground-engaging member is a wheel, and wherein the holder mounted to the rotatable support bracket is a wheel holder. In still another aspect of some embodiments, the rotatable arm includes a brace support on its upper surface. In an additional aspect of some embodiments, the seat support member is adjustable to raise and lower the seat. Moreover, in some aspects the seat is rotatably connected to the seat support shaft.

In other embodiments of the swing arm method for providing operator support over a pallet, the method includes: connecting a ground-engaging support platform to a main vertical support brace, the main vertical support brace including a top bearing hub and a bottom bearing hub, rotatably connecting a long pivot shaft connected to the main vertical support brace by one or more primary bearing hubs, connecting the long pivot shaft to a support bracket, wherein the support bracket includes one or more secondary bearing hubs, connecting a holder mounted to the support bracket, the holder being an operative associated with a ground-engaging member, rotatably connecting a short pivot shaft to the support bracket by the one or more secondary bearing hubs, connecting a swing arm to the short pivot shaft, the swing arm including a seat support collar, mounting a seat support shaft on the seat support collar, and rotatably connecting a seat to the seat support shaft.

In some embodiments of the swing arm method for providing operator support over a pallet, the method further comprises: securing one or more angled platform engaging supports to the main vertical support brace and the ground-engaging support platform. In another aspect of some embodiments, the ground-engaging member is a wheel, and wherein the holder mounted to the rotatable support bracket is a wheel holder. In still another aspect of some embodiments, the method further comprises: securing a brace support on an upper surface of the swing arm.

These features with other technological improvements, which will become subsequently apparent, reside in the details of construction and operation as more fully described hereafter and claimed, reference being had to the accompanying drawings forming a part hereof.

BRIEF DESCRIPTION OF THE DRAWINGS

The present application will be more fully understood by reference to the following figures, which are for illustrative purposes only. The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Figure 1:
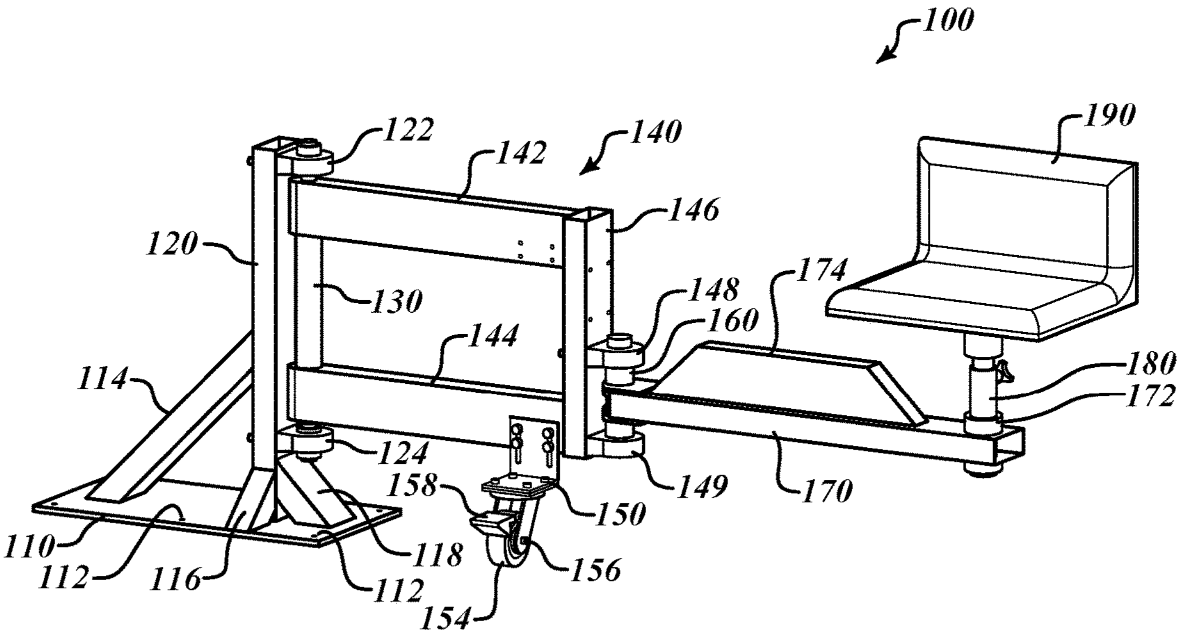
FIG. 1 illustrates a perspective view of a swing arm system and method, in accordance with a disclosed embodiment.

Persons of ordinary skill in the art will understand that the present disclosure is illustrative only and not in any way limiting. Other embodiments and various combinations of the presently disclosed system and method readily suggest themselves to such skilled persons having the assistance of this disclosure.

Each of the features and teachings disclosed herein can be utilized separately or in conjunction with other features and teachings to provide a swing arm system and method. Representative examples utilizing many of these additional features and teachings, both separately and in combination, are described in further detail with reference to attached FIGS. 1-4. This detailed description is intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present system and method. However, it will be apparent to one skilled in the art that these specific details are not required to practice the teachings of the present system and method. Also, other methods and systems may be used.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

Figure 2:
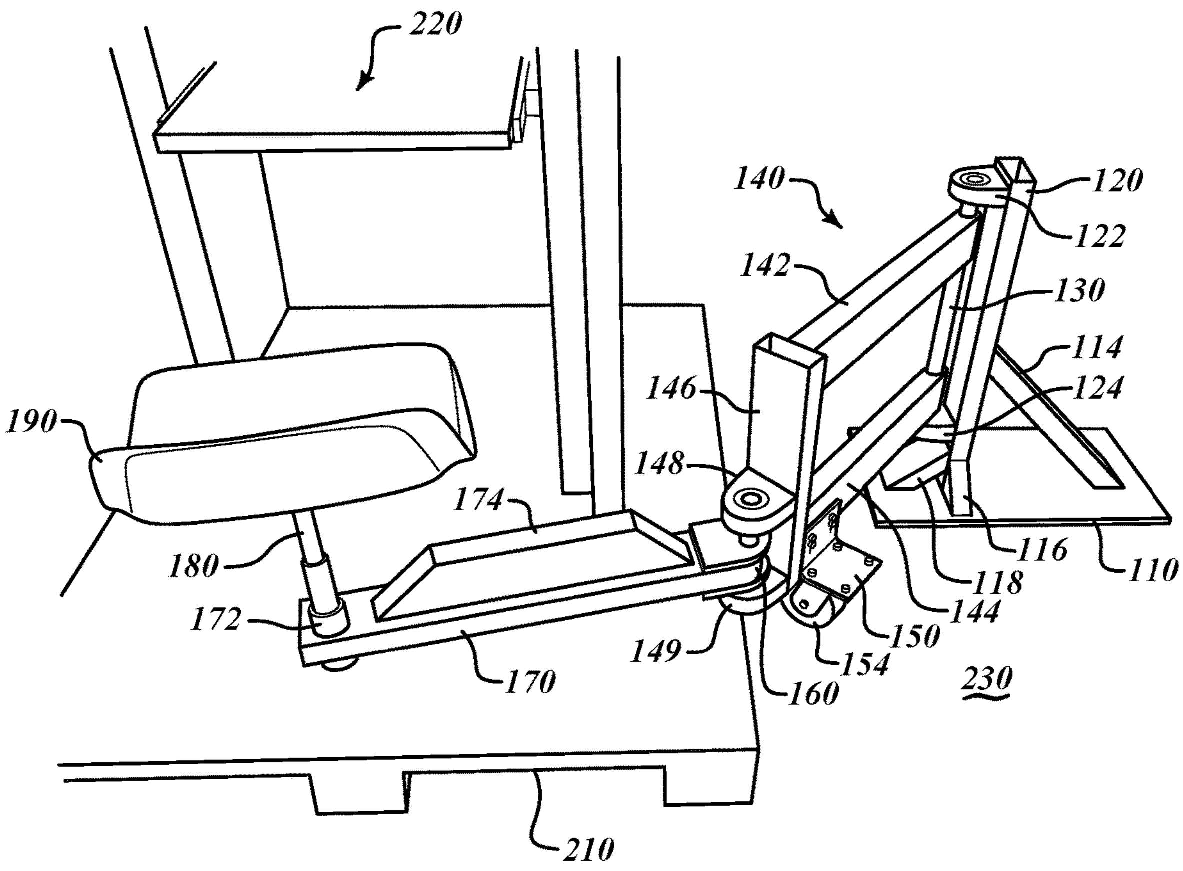
FIG. 2 illustrates an elevated perspective view of a swing arm system and method in use with a pallet and cabinet assembly, in accordance with a disclosed embodiment.

Referring now to FIGS. 1 and 2, a swing arm system 100 for providing operator support over a pallet 210 is shown. In one or more embodiments, the swing arm system 100 includes: a ground-engaging support platform 110, a main vertical support brace 120, a vertical long pivot shaft 130, a rotatable rectangular support bracket 140, a ground-engaging member holder 150, a vertical short pivot shaft 160, a swing arm 170, a seat support shaft 180, and a seat 190. As shown in FIG. 2, the rotatable rectangular support bracket 140, the ground-engaging member holder 150, the vertical short pivot shaft 160, the swing arm 170, the seat support shaft 180, and the seat 190 of the swing arm system 100 all rotate about the vertical long pivot shaft 130. Additionally, the swing arm 170, the seat support shaft 180, and the seat 190 of the swing arm system 100 all rotate about the vertical short pivot shaft 160. In this manner, the rotation of the vertical long pivot shaft 130 enables portions of the swing arm system 100 to be positioned next to the pallet 210, and the rotation of the vertical short pivot shaft 160 enables portions of the swing arm system 100 to be positioned over the pallet 210. Specifically, the swing arm 170, the seat support shaft 180, and the seat 190 of the swing arm system 100 are able to be positioned over the pallet 210 to assist the operator, e.g., to assemble a cabinet 220 that is positioned on the pallet 210, without being forced into awkward and accident-inducing positions for long periods of time.

In some embodiments of the swing arm system 100, a foundational component is the ground-engaging support platform 110. The ground-engaging support platform 110 is the component that secures the swing arm system 100 to the ground 230. The ground-engaging support platform 110 includes a flat or substantially flat plate that is secured to the ground 230 or floor of a warehouse or other structure. As shown in FIGS. 1 and 2, in some embodiments the ground-engaging support platform 110 is rectangular with the two of the parallel (or substantially parallel) sides being longer than the remaining two of the parallel (or substantially parallel) sides. However, in other embodiments, the ground-engaging support platform 110 may be configured as a square, circle, rectangle, or other suitable geometric shape. Notably, the length of the rectangle does provide structural load-being support that could be diminished by the selection of some other configurations.

As shown in FIGS. 1 and 2, the ground-engaging support platform 110 includes fastener holes 112 for removable securement to the ground 230. In some embodiments, there are six fastener holes 112 in the ground-engaging support platform 110, one near each corner of the rectangular ground-engaging support platform 110 and one near the midpoint of the longer sides of the rectangular ground-engaging support platform 110. In other embodiments, only four fastener holes 112 in the ground-engaging support platform 110 are needed for sufficient load-bearing support, one near each corner of the rectangular ground-engaging support platform 110. As shown in FIG. 2, bolts (and washers) are used to secure the ground-engaging support platform 110 to the warehouse floor 230 in some embodiments. In other embodiments, screws, nails, or other mechanical fasteners are used to secure the ground-engaging support platform 110 to the warehouse floor 230 through the fastener holes 112. In still other embodiments with different flooring configurations (not shown), the ground-engaging support platform 110 could be clamped to flooring beams or girders. While the above embodiments have described a ground-engaging support platform 110 with removable securement to the ground 230, in other embodiments the ground-engaging support platform 110 is permanently secured to the ground, such as by welding the platform to the warehouse floor.

Referring now to another aspect of the swing arm system 100, in some embodiments the main vertical support brace 120 is connected perpendicularly to the ground-engaging support platform 110. While the main vertical support brace 120 is described as vertical, it will be understood that in some embodiments the support brace 120 is generally or substantially vertical, but not absolutely vertical. Such general verticalness may include an angle of 1, 2, 5, 10, 15, or 20 degrees, as well as intermediate degrees, off of true vertical. Additionally, while the main vertical support brace 120 has been described as being connected perpendicularly to the ground-engaging support platform 110, it will be understood that in some embodiments the support brace 120 is generally or substantially perpendicular, but not absolutely perpendicular. Such general perpendicularity may include an angle of 1, 2, 5, 10, 15, or 20 degrees, as well as intermediate degrees, off of being truly perpendicular.

As shown in FIGS. 1 and 2, in one or more embodiments of the swing arm system 100, one or more angled platform engaging supports 114, 116, and 118 secure the main vertical support brace 120 to the ground-engaging support platform 110 and provide additional load-being support. In the embodiments shown in FIGS. 1 and 2, the rear angled platform engaging support 114 connects a rear portion of the ground-engaging support platform 110 to a back side of the main vertical support brace 120. Some such embodiments further include one or more side angled platform engaging supports 116 that connect to one or more side portions of the ground-engaging support platform 110. Additionally, in some further aspects of some embodiments, the front angled platform engaging support 118 connects a front portion of the ground-engaging support platform 110 to a front side of the main vertical support brace 120.

Referring now to another aspect of the swing arm system 100, in some embodiments the main vertical support brace 120 is connected to a top bearing hub 122 near the top of the main vertical support brace 120 and a bottom bearing hub 124 near the top of the main vertical support brace 120. The bearing hubs may be ball bearing, roller bearings, or other known bearing systems. In other embodiments, the main vertical support brace 120 may be connected to only a single bearing hub or to more than two bearing hubs, depending on the amount of load that the swing arm system 100 is being configured to bear. In still other embodiments, the main vertical support brace 120 is not connected to bearing hubs, but rather to other alternative rotational connection mounts.

As shown in FIGS. 1 and 2, in one or more embodiments of the swing arm system 100, the vertical long pivot shaft 130 is rotatably connected to the main vertical support brace 120 by the top bearing hub 122 and a bottom bearing hub 124. While the vertical long pivot shaft 130 is described as vertical, it will be understood that in some embodiments the long pivot shaft 130 is generally or substantially vertical, but not absolutely vertical. Such general verticalness may include an angle of 1, 2, 5, 10, 15, or 20 degrees, as well as intermediate degrees, off of true vertical. In some embodiments, the vertical long pivot shaft 130 may be connected to only a single bearing hub or to more than two bearing hubs, depending on the amount of load that the vertical long pivot shaft 130 is being configured to bear. As described above, in other embodiments, the vertical long pivot shaft 130 is not connected to bearing hubs, but rather to other alternative rotational connection mounts.

Referring now to another aspect of the swing arm system 100, in some embodiments the rotatable rectangular support bracket 140 is connected to the vertical long pivot shaft 130. In one or more embodiments, the rectangular support bracket 140 includes a top brace 142, a bottom brace 144, and a front vertical brace 146 that connects the top brace 142 and bottom brace 144. The top brace 142 is connected to the vertical long pivot shaft near the top bearing hub 122 and the bottom brace 144 is connected to the vertical long pivot shaft near the bottom bearing hub 124. While the rotatable rectangular support bracket 140 is described as rectangular, it will be understood that in some embodiments the support bracket 140 has opposing sides (e.g., the top brace 142 and the bottom brace 144) that are generally or substantially parallel, but not absolutely parallel. Such general parallelism of the opposing sides of the rectangular support bracket 140 may include an angle of 1, 2, 5, 10, 15, or 20 degrees, as well as intermediate degrees, off of true parallel.

Additionally, in some embodiments, the front vertical brace 146 is connected to an upper bearing hub 148 and a lower bearing hub 149. The bearing hubs 148 and 149 may be ball bearing, roller bearings, or other known bearing systems. In other embodiments, the front vertical brace 146 may be connected to only a single bearing hub or to more than two bearing hubs, depending on the amount of load that the swing arm system 100 is being configured to bear. In still other embodiments, the front vertical brace 146 is not connected to bearing hubs, but rather to other alternative rotational connection mounts.

Referring now to another aspect of the swing arm system 100, in some embodiments the ground-engaging member holder 150 is mounted to the bottom brace 144 of the rotatable rectangular support bracket 140. In another aspect of such embodiments, the ground-engaging member holder 150 is an operative associated with a ground-engaging member 154. In some such embodiments, the ground-engaging member holder 150 is a wheel holder, and the ground-engaging member 154 is a wheel. In one or more embodiments, the wheel 154 is connected to the wheel holder 150 by an axle 156 (shown in FIGS. 1 and 4). In one or more embodiments, the wheel 154 rolls along the surface of the warehouse floor 230 when the rotatable rectangular support bracket 140 rotates about the vertical long pivot shaft 130. In some such embodiments, once the wheel 154 has rolled along the surface of the warehouse floor 230 into position next to a pallet 210 by rotating about the vertical long pivot shaft 130, the wheel 154 may then be locked into place by depressing a wheel lock 158 (shown in FIGS. 1 and 4) that secures against the wheel 154 and prevents it from rotating.

One technological improvement provided by the wheel 154 of swing arm system 100 is that the swing arm 170 and the seat 190 of the swing arm system 100 can be adjustably positioned close to a pallet upon which an operator will be assembling products or systems while sitting on the seat 190. Another technological improvement provided by the wheel 154 of swing arm system 100 is that the wheel 154 carries a significant amount of load positioned on the seat 190 of the swing arm system 100, instead of having the swing arm 170 cantilevered all the way to the ground-engaging support platform 110.

Figure 3:
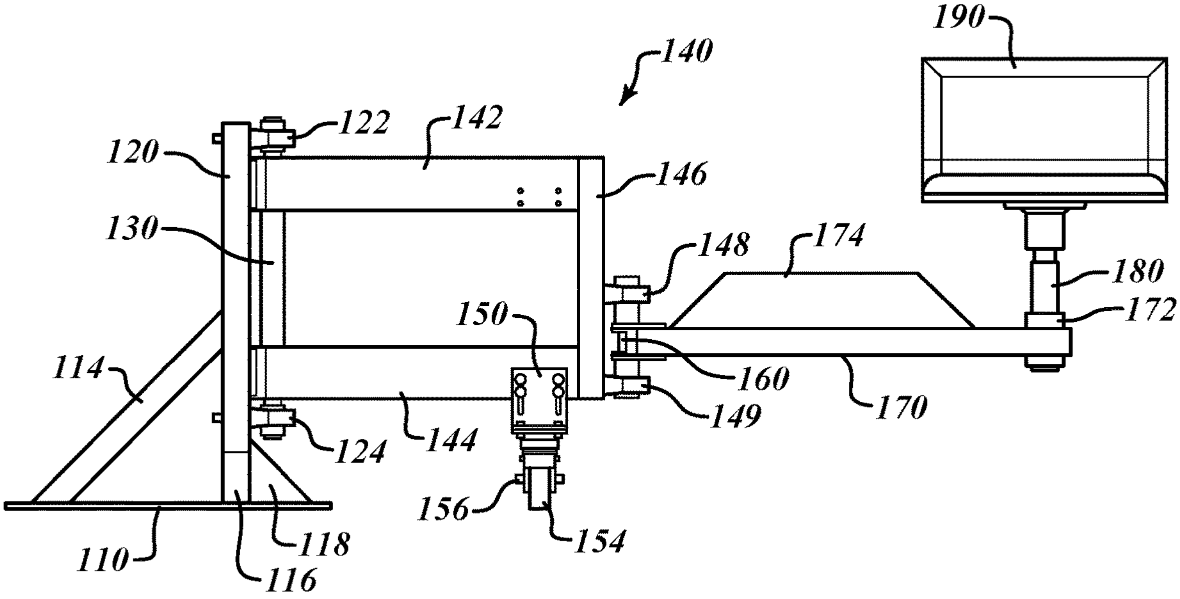
FIG. 3 illustrates side view of a swing arm system and method, in accordance with a disclosed embodiment.
Figure 4:
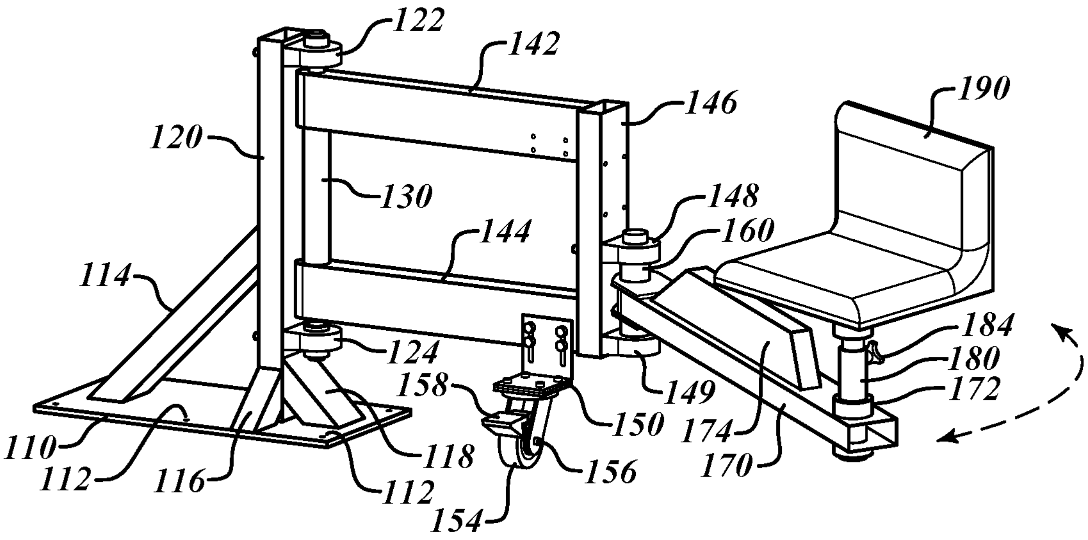
FIG. 4 illustrates another perspective view of a swing arm system and method, in accordance with a disclosed embodiment.

As shown in FIGS. 3 and 4, in one or more embodiments of the swing arm system 100, the vertical short pivot shaft 160 is rotatably connected to the front vertical brace 146 by the upper bearing hub 148 and a lower bearing hub 149. While the vertical short pivot shaft 160 is described as vertical, it will be understood that in some embodiments the short pivot shaft 160 is generally or substantially vertical, but not absolutely vertical. Such general verticalness may include an angle of 1, 2, 5, 10, 15, or 20 degrees, as well as intermediate degrees, off of true vertical. In some embodiments, the vertical short pivot shaft 160 may be connected to only a single bearing hub or to more than two bearing hubs, depending on the amount of load that the vertical short pivot shaft 160 is being configured to bear. As described above, in other embodiments, the vertical short pivot shaft 160 is not connected to bearing hubs, but rather to other alternative rotational connection mounts.

Referring now to another aspect of the swing arm system 100, in some embodiments the swing arm 170 is connected to the vertical short pivot shaft 160 between the upper bearing hub 148 and the lower bearing hub 149. The swing arm 170 is connected to the vertical short pivot shaft 160 at the rear end of the swing arm 170. In one or more embodiments, the swing arm 170 is disposed parallel to the ground 230. While the swing arm 170 is described as parallel to the ground 230, it will be understood that in some embodiments the swing arm 170 is generally or substantially parallel, but not absolutely parallel. Such general parallelism of the opposing sides of the rectangular support bracket 140 may include an angle of 1, 2, 5, 10, 15, or 20 degrees, as well as intermediate degrees, off of true parallel. In another aspect, the swing arm 170 includes a seat support collar 172 at or near the front end of the swing arm 170.

Notably, in still another aspect of the swing arm system 100, the swing arm 170 includes a brace support 174 on its upper surface. The brace support 174 provides load bearing rigidity that increases the amount of load that can be handled on the seat 190 (e.g., load of the operator's weight). The load bearing capacity of the swing arm system 100 may be increased by increasing the length of the brace support 174 along the upper surface of the swing arm 170, the height of the brace support 174 above the upper surface of the swing arm 170, or the width of the brace support 174 with respect to the width of the swing arm 170. In some embodiments of the swing arm system 100 the sides of the brace support 174 are angled inward towards the top of the brace support 174 to create a frusto-pyramidal shape (i.e., a truncated pyramid). Additionally, in one or more embodiments of the swing arm system 100, the brace support 174 is welded to the upper surface of the swing arm 170; however, in other embodiments, the brace support 174 is connected to the upper surface of the swing arm 170 using other securement techniques.

Referring now to another aspect of the swing arm system 100, in some embodiments the seat support shaft 180 is mounted to the seat support collar 172 of the swing arm 170. In one or more embodiments, the seat support shaft 180 is adjustable to raise and lower the seat 190. As shown in FIG. 4, the seat support shaft 180 is adjustable to raise and lower the seat 190 by activating an adjustment lever 184. This adjustability is a significant feature since a technological improvement provided by the swing arm system 100 is to assist and support operators working to assemble products or systems on a pallet adjacent the swing arm system 100 by enabling the operators to sit on the seat rather than hunch or lean in awkward positions. The adjustability to raise and lower the seat 190 enables operators of different heights to be able to use the swing arm system 100 in a substantially equivalent manner.

Furthermore, as shown in FIGS. 3 and 4, in one or more embodiments of the swing arm system 100, the seat 190 is operatively connected to the seat support shaft 180. In another aspect, the seat is rotatably connected to the seat support shaft 180. The rotation of the seat 190 on the seat support shaft 180 enables an operator to face different directions while sitting on the seat 190 and working to assemble products or systems on a pallet adjacent the swing arm system 100. In some embodiments, the seat 190 is connected to the seat support shaft 180 using a bearing assembly. The bearing assembly may be ball bearing, roller bearings, or other known bearing systems. In other embodiments, the seat 190 is not connected to the seat support shaft 180 using a bearing assembly, but rather using another alternative rotational connection mount. In some embodiments, the seat 190 is only a horizontal or substantially horizontal seating area, while in other embodiments, the seat 190 also includes a back support region, as shown in FIGS. 3 and 4, that provides back support to an operator sitting on the seat 190. In another aspect of some embodiments, the seat 190 also includes a belt, harness, or other securement mechanism (not shown) to enable the operator to lean out from the seat 190 with reduced or no danger of falling out of the seat 190.

The foregoing description, for purposes of explanation, uses specific nomenclature and formula to provide a thorough understanding of the disclosed embodiments. It should be apparent to those of skill in the art that the specific details are not required in order to practice the disclosure. The embodiments have been chosen and described to best explain the principles of the disclosed embodiments and its practical application, thereby enabling others of skill in the art to utilize the disclosed embodiments, and various embodiments with various modifications as are suited to the particular use contemplated. Thus, the foregoing disclosure is not intended to be exhaustive or to limit the disclosure to the precise forms disclosed, and those of skill in the art recognize that many modifications and variations are possible in view of the above teachings.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above described exemplary embodiments, but should be defined only in accordance with the following claims and their equivalents.

The invention claimed is:

1. A system for providing operator support over a pallet, the system comprising:

a ground-engaging support platform;

a main vertical support brace connected to the ground-engaging support platform, the main vertical support brace including a top bearing hub and a bottom bearing hub;

a vertical long pivot shaft rotatably connected to the main vertical support brace by the top bearing hub and a bottom bearing hub;

a rotatable rectangular support bracket including a top brace, a bottom brace, and a front vertical brace that connects the top brace and bottom brace, wherein the top brace is connected to the vertical long pivot shaft near the top bearing hub and the bottom brace is connected to the vertical long pivot shaft near the bottom bearing hub, wherein the front vertical brace includes an upper bearing hub and a lower bearing hub;

a holder mounted to the bottom brace of the rotatable rectangular support bracket, the holder operatively associated with a ground-engaging member;

a vertical short pivot shaft rotatably connected to the front vertical brace by the upper bearing hub and a lower bearing hub;

a swing arm connected to the vertical short pivot shaft, the swing arm including a seat support collar;

a seat support shaft mounted on the seat support collar; and a seat operatively connected to the seat support shaft.

2. The system of claim 1, wherein one or more angled platform engaging supports secure the main vertical support brace to the ground-engaging support platform.

3. The system of claim 1, wherein the ground-engaging support platform includes fastener holes for removable securement to a ground.

4. The system of claim 1, wherein the ground-engaging member is a wheel, and wherein the holder mounted to the bottom brace is a wheel holder.

5. The system of claim 1, wherein the swing arm includes a brace support on its upper surface.

6. The system of claim 1, wherein the seat support shaft is adjustable to raise and lower the seat.

7. The system of claim 1, wherein the seat is rotatably connected to the seat support shaft.

8. A system, comprising:

an upright support brace connected to one or more primary bearing hubs;

a first pivot member rotatably connected to the upright support brace by the one or more primary bearing hubs;

a rotatable support bracket connected to the first pivot member at a first end, wherein the support bracket is further connected to one or more secondary bearing hubs at a second end;

a wheel holder mounted on the rotatable support bracket, wherein the wheel holder is operatively associated with a wheel;

a second pivot member rotatably connected to the rotatable support bracket by the one or more secondary bearing hubs;

a rotatable arm connected to the second pivot member;

a seat support member operatively connected with the rotatable arm; and a seat operatively connected to the seat support member.

9. The system of claim 8, further comprising a ground-engaging support platform.

10. The system of claim 9, wherein one or more angled platform engaging supports secure the upright support brace to the ground-engaging support platform.

11. The system of claim 8, wherein the ground-engaging support platform includes fastener holes for removable securement to a ground.

12. The system of claim 8, wherein the seat support member is adjustable to raise and lower the seat.

13. The system of claim 8, wherein the seat is rotatably connected to a seat support shaft.

14. The system of claim 8, wherein the rotatable arm includes a brace support on its upper surface.

15. A method, comprising:

connecting a ground-engaging support platform to a main vertical support brace, the main vertical support brace including a top bearing hub and a bottom bearing hub;

rotatably connecting a long pivot shaft connected to the main vertical support brace by one or more primary bearing hubs;

connecting the long pivot shaft to a support bracket, wherein the support bracket includes one or more secondary bearing hubs;

connecting a holder mounted to the support bracket, the holder being an operatively associated with a ground-engaging member;

rotatably connecting a short pivot shaft to the support bracket by the one or more secondary bearing hubs;

connecting a swing arm to the short pivot shaft, the swing arm including a seat support collar;

mounting a seat support shaft on the seat support collar; and rotatably connecting a seat to the seat support shaft.

16. The method of claim 15, wherein the ground-engaging member is a wheel, and wherein the holder mounted to the rotatable support bracket is a wheel holder.

17. The method of claim 15, further comprising securing a brace support on an upper surface of the swing arm.

18. The method of claim 15, further comprising securing one or more angled platform engaging supports to the main vertical support brace and the ground-engaging support platform.

* * * * *